(12) United States Patent
Wyckoff

(10) Patent No.: US 7,539,611 B1
(45) Date of Patent: May 26, 2009

(54) METHOD OF IDENTIFYING AND HIGHLIGHTING TEXT

(76) Inventor: Richard O. Wyckoff, 10750 Old Frederick Rd., Woodstock, MD (US) 21163

( * ) Notice: Subject to any disclaimer, the term of this patent is extended or adjusted under 35 U.S.C. 154(b) by 832 days.

(21) Appl. No.: 10/994,014

(22) Filed: Nov. 19, 2004

(51) Int. Cl.
  *G06F 17/27* (2006.01)
(52) U.S. Cl. .................. 704/9; 704/1; 704/10; 707/2; 707/3; 707/4; 707/5; 707/6; 715/255; 715/265
(58) Field of Classification Search ............ 704/1–10; 707/2–6; 715/255, 265
  See application file for complete search history.

(56) References Cited

U.S. PATENT DOCUMENTS

| | | | |
|---|---|---|---|
| 5,287,278 A | | 2/1994 | Rau |
| 5,515,534 A | * | 5/1996 | Chuah et al. ................. 707/101 |
| 5,819,265 A | | 10/1998 | Ravin et al. |
| 5,832,480 A | | 11/1998 | Byrd, Jr. et al. |
| 6,374,210 B1 | * | 4/2002 | Chu .............................. 704/9 |
| 6,999,957 B1 | * | 2/2006 | Zamir et al. .................... 707/3 |
| 7,219,052 B2 | * | 5/2007 | Sites ........................... 704/10 |
| 7,236,923 B1 | * | 6/2007 | Gupta ............................. 704/9 |
| 7,409,334 B1 | * | 8/2008 | Shoemaker ..................... 704/8 |
| 2004/0122656 A1 | * | 6/2004 | Abir ................................ 704/4 |
| 2005/0192792 A1 | * | 9/2005 | Carus et al. ..................... 704/2 |

\* cited by examiner

*Primary Examiner*—Patrick N Edouard
*Assistant Examiner*—Lamont M Spooner
(74) *Attorney, Agent, or Firm*—Robert D. Morelli

(57) ABSTRACT

The present invention is a method of identifying and highlighting textual units of interest using a computer. Text is received and tokens therein are identified. Prefixes, suffixes, and roots are identified and replaced with their standard forms. Starting and continuing tokens of textual units of interest are identified and printed in a user-defined font. The other tokens are printed in another user-defined font.

14 Claims, 1 Drawing Sheet

METHOD OF IDENTIFYING AND HIGHLIGHTING TEXT

FIELD OF THE INVENTION

The present invention pertains to data processing, database and file management or data structures and, more particularly, query augmenting or refining.

BACKGROUND OF THE INVENTION

Many prior methods of identifying and highlighting text in a document rely on syntactic or semantic parsing methods, or probabilities, or string matching.

Generally, parsing methods are slow and fail, or degrade, dramatically given less than highly structured text. Many parsers work well for highly structured prose found in newspapers but do not work well on less structured text.

Probabilistic methods such as those used in Hidden Markov Models require substantial training sets and, generally, are not very accurate.

String matching on large lists generally require substantial storage capacity and are either limited to recognizing specific spellings or are slow if not so limited.

Therefore, there is a need for a more accurate and faster method of identifying text and highlighting the same. The present invention is such a method.

U.S. Pat. No. 5,287,278, entitled "METHOD FOR EXTRACTING COMPANY NAMES FROM TEXT," discloses a method of identifying a name of a company by first locating its suffix (i.e., Company, Corporation) and then locating the beginning of the company's name. The present invention is not limited to using suffixes, and uses additional steps not disclosed in U.S. Pat. No. 5,287,278. U.S. Pat. No. 5,287,278 is hereby incorporated by reference into the specification of the present invention.

U.S. Pat. No. 5819,265, entitled "PROCESSING NAMES IN A TEXT," discloses a device for and a method of identifying a proper name in text by identifying capitalized words and specially designated words. Then, leading and trailing substrings (e.g., spaces, punctuation) are removed. Then, the identified word is split, if possible, until it cannot be split any further. The result is a list of possible proper names. The present invention does not use the same method as does U.S. Pat. No. 5,819,265 and includes steps that are not disclosed in U.S. Pat. No. 5,819,265. U.S. Pat. No. 5,819,265 is hereby incorporated by reference into the specification of the present invention.

U.S. Pat. No. 5,832,480, entitled "USING CANONICAL FORMS TO DEVELOP A DICTIONARY OF NAMES IN A TEXT," discloses a device for and a method of creating canonical forms of a proper name in text by first establishing an equivalence group where each name, which was identified using the method of U.S. Pat. No. 5,819,265, shares an attribute (e. g., professional title, suffix, last name, personal title, first name, prefix, nickname, organization place, organization tag, organization name). Then, selecting the name with a high confidence score as an anchor. Then, designating one or more names that share an attribute with the anchor as a variant of the anchor. The present invention does not use the same method as does U.S. Pat. No. 5,832,480 and includes steps that are not disclosed in U.S. Pat. No. 5,832,480. U.S. Pat. No. 5,832,480 is hereby incorporated by reference into the specification of the present invention.

SUMMARY OF THE INVENTION

It is an object of the present invention to identify user-definable text in a document and highlight the same.

It is another object of the present invention to identify user-definable text in one language in a document of another language and highlight the same.

It is another object of the present invention to identify, independent of the character case, user-definable text in one language in a document of another language and highlight the same.

The present invention is a method of identifying textual units (e. g., names) in a document and highlighting the same using a computer.

The first step of the method is receiving text.

The second step of the method is identifying each token in the text.

The third step of the method is selecting a token.

The fourth step of the method is determining if the token includes a user-definable prefix, user-definable root, user-definable suffix, user-definable disqualified textual unit, and the token's length.

The fifth step of the method is replacing each identified prefix, root, and suffix with a standard form of the same.

If there is an unselected token then the sixth step of the method is selecting the token next in sequence and returning to the fourth step.

The seventh step of the method is reselecting the token selected in the third step.

If the reselected token does not start a user-definable textual unit then the eighth step of the method is printing the reselected token in a first font, reselecting the token next in sequence and returning to the eighth step, and if no token to reselect then stopping.

If the reselected token does start a user-definable textual unit then the ninth step of the method is marking the reselected token for highlighting, reselecting the token next in sequence, and if no token to reselect then printing in the second font the reselected token marked for highlighting and stopping.

If the token reselected in the last step is an end-of-textual-unit indicator then the tenth step of the method is printing in the second font the reselected token marked for highlighting except tokens marked as loose tokens, printing tokens marked as loose tokens in the first font, and returning to the eighth step.

If the token reselected in the ninth step is not an end-of-textual-unit indicator then the eleventh step of the method is determining if the reselected token marked for highlighting can include an additional token.

If the reselected token marked for highlighting can include an additional token then the twelfth step of the method is determining if the reselected token can be concatenated to the reselected token marked for highlighting.

If the reselected token marked for highlighting can include an additional token and the reselected token cannot be concatenated to the reselected token marked for highlighting without qualification then the thirteenth step of the method is marking the reselected token as a loose token, concatenating the reselected token to the reselected token marked for highlighting, reselecting token next in sequence and returning to the tenth step, and if no token to reselect then printing in the second font the reselected token marked for highlighting except for any reselected token marked as a loose token, and printing in the first font any reselected token marked as a loose token and stopping.

If the reselected token marked for highlighting can include an additional token and the reselected token can be concatenated to the reselected token marked for highlighting without qualification then the fourteenth step of the method is concatenating the reselected token to the reselected token marked for highlighting, removing the loose token mark from any reselected token so marked, reselecting token next in sequence and returning to the tenth step, and if no token to reselect then printing in the second font the reselected token marked for highlighting and stopping.

If the reselected token marked for highlighting cannot include an additional token then the fifteenth step of the method is printing in the second font the reselected token marked for highlighting except any reselected token marked as a loose token, printing in the first font any reselected token marked as a loose token, and returning to the eighth step.

DETAILED DESCRIPTION

Figure 1:
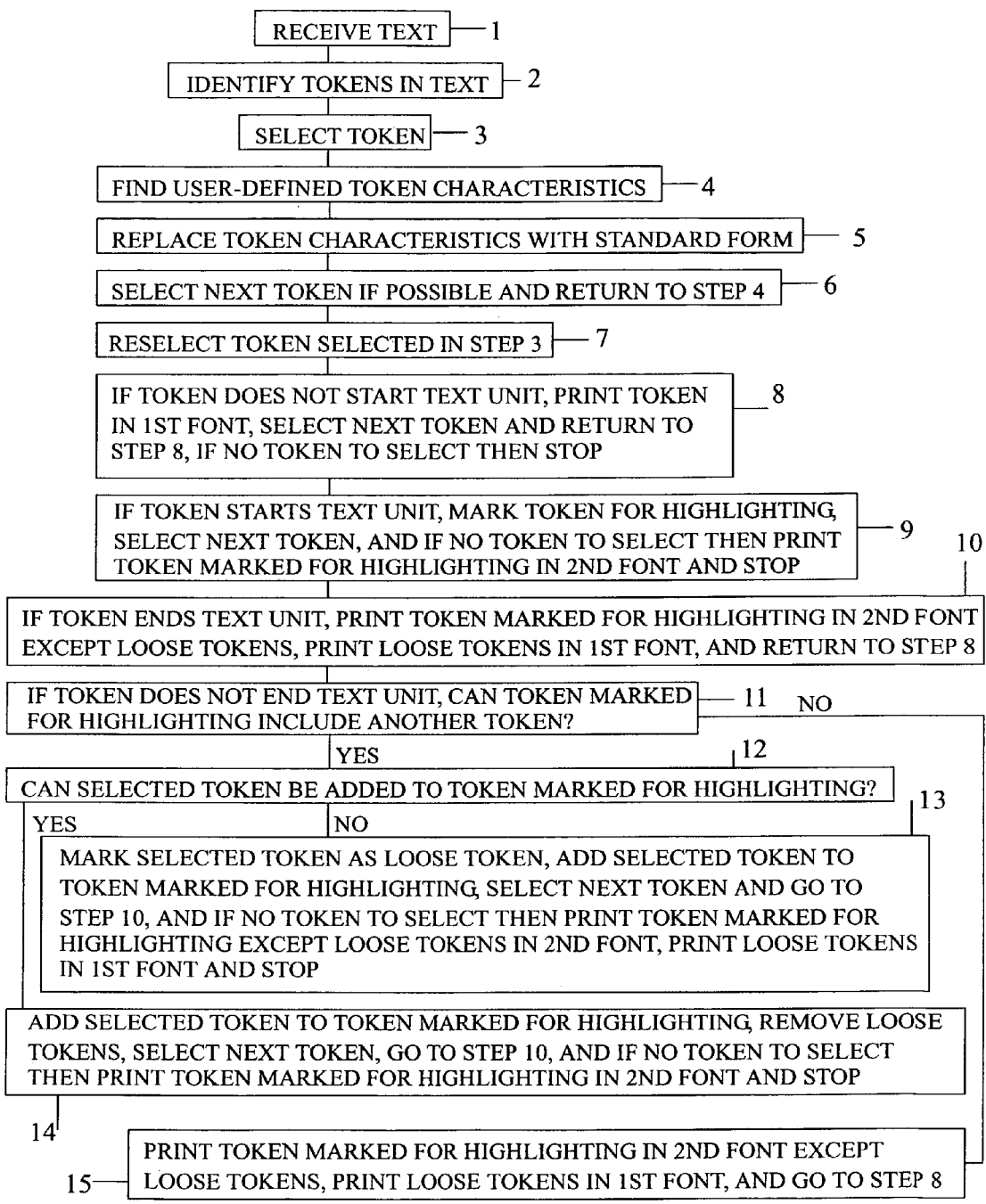
FIG. 1 is a list of the steps of the present invention.

The present invention is a method of identifying user-definable textual units and highlighting the same using a computer. The steps of the method are listed in FIG. 1.

The first step 1 of the method is receiving text on a computer. The received text may be from one or more documents, or may be provided in query form. In the preferred embodiment, the text is in a first language, where the user-definable textual units of interest (e.g., names, places, things, events, time periods, results) are transliterated into the first language from a second language.

The second step 2 of the method is identifying each token in the text. In the preferred embodiment, a token is an alpha-numeric string that may include leading spaces and leading punctuation. The alpha-numeric portion of a token is referred to as a "word," whereas a leading space, leading punctuation, end-of-line indicator (i. e., carriage return), and any combinations thereof is referred to as a "pre-word." However, any other suitable non-textual information may be included in the pre-word. In an alternate embodiment, the characters of each token may be converted to all one case (i.e., upper case or lower case).

The third step 3 of the method is selecting a token. In the preferred embodiment, the first token selected is the first token in the text. However, any token may be selected as the first token. Thereafter, the tokens are selected in sequence or, in other words, order of occurrence.

The fourth step 4 of the method is determining if the token includes a prefix, root, suffix, disqualified textual unit, and what is the token's length. In the preferred embodiment, the prefix, root, and suffix are user-definable (e.g., from a dictionary) and are transliterated prefixes, roots, and suffixes from a different language than that of the text in which the token appears. However, the method of the present invention works equally well on text that includes prefixes, roots, and suffixes in the same language as that of the text. The disqualified textual unit is also user-definable and preferably consists of a word in the language of the text that is irrelevant to the type of textual unit to be highlighted. For example, if names are to be highlighted then disqualified textual units include words in the language of the text that are not names. A user-definable list of stop-words in the language of the text may also be included as disqualified textual units. A dictionary may be established for either or both types of disqualified textual units.

The fifth step 5 of the method is replacing each identified prefix, root, and suffix with a standard form of the same. The fifth step 5 accounts for any variation in the type of text that is possible (e.g., Joe for Joseph, 3M for Minnesota Mining and Manufacturing).

If there is an unselected token then the sixth step 6 of the method is selecting the token next in sequence and returning to the fourth step 4. Otherwise, proceeding to the next step. The present invention requires the tokens be processed in order once the first token is selected, which may be the first, or user-definably placed, token in the text.

After the tokens of interest are processed a first time to determine their content and such, they are processed a second time as follows.

The seventh step 7 of the method is reselecting the first token selected in the third step 3.

If the token reselected in the seventh step 7 does not start a user-definable textual unit then the eighth step 8 of the method is printing the reselected token in a first font, reselecting the token next in sequence and returning to the eighth step 8, and if no token to reselect then stopping. A token is determined to start a textual unit if it satisfies the following logical relationship: (the token includes a user-definable root OR the token includes a user-definable prefix) AND (the token does not include a user-definable disqualified textual unit) AND (the token does not include less than two characters). In the preferred embodiment, the first font is the same as that of the token as received in the first step 1.

If the reselected token does start a user-definable textual unit then the ninth step 9 of the method is marking the reselected token for highlighting, reselecting the token next in sequence, and if there are no tokens to reselect then printing in a second font the reselected token marked for highlighting and stopping. In the preferred embodiment, the second font is a font selected from the following list of fonts: bolded, underlined, colored, italicized, superscripted, subscripted, hyperlinked, and any other suitable font. In an alternate embodiment, multiple second fonts (e.g., bold and even more bold) may be used to indicate different degrees of highlighting (e.g., weak, strong, very strong, etc.). Varying degrees of highlighting may be based on the number of characters or elements in the textual unit to be highlighted or on a user-settable strength rating of user-definable characters or elements in the textual unit to be highlighted.

If the token reselected in the last step is an end-of-textual-unit indicator then the tenth step 10 of the method is printing in the second font the reselected token marked for highlighting except any reselected token marked as a loose token, printing loose tokens in the first font, and returning to the eighth step 8. End-of-textual-unit indicators are a function of the type of text to be highlighted. For example, if personal and company names are to be highlighted then indicators such as "AKA," "formerly," "Company," and "Incorporated" would be good end-of-textual-unit indicators, In the preferred embodiment, the end-of-textual-unit indicators could be transliterated from a language other than the language of the text. In the preferred embodiment, an end-of-textual unit indicator is a token that satisfies the following logical relationship: (the token is a number OR (the token is a user-definable disqualified word) OR (the token includes a user-definable condition, where the user-definable condition includes having more than one line-indicator)). A user-definable disqualified word includes one that satisfies the following logical relationship: (the token is longer than 6 characters OR the token is (longer than 10 characters AND ends in "ed")) OR (the token is an end-of-textual-unit indicator) OR (the token includes a space OR includes punctuation).

If the token reselected in the ninth step 9 is not an end-of-textual-unit indicator then the eleventh step 11 of the method is determining if the reselected token marked for highlighting can include an additional token. A token is determined to not be able to include an additional token if it satisfies the following logical relationship: (the number of loose tokens in the token to be highlighted is less than a user-definable number AND the number of loose tokens in the token to be highlighted that are user-definable disqualified textual units is below a user-definable number AND (the token does not include a new-line indicator OR the token is below 80 characters in length)). A user-definable disqualified textual unit includes a textual unit that is recognizable as a known word in the main language of the document in which it appears.

If the reselected token marked for highlighting can include an additional token then the twelfth step 12 of the method is determining if the reselected token can be concatenated to the reselected token marked for highlighting. A token can be concatenated to another token if it satisfies the following logical relationship: ((the word portion of the token includes only alphabetic characters AND the token follows a prefix other than the character "a") OR ((the word portion of the token is not a user definable disqualified word) AND ((the token includes a user-definable root) OR (the token includes a user-definable prefix AND (the token directly follows a token not identified as loose OR is not the character "a" OR the token does not directly follow a disqualified word)) OR (the word portion of the token is a user-definable suffix AND the token directly follows a token that is not marked as a loose token))) OR (the token reselected includes two open parentheses)).

If the reselected token marked for highlighting can include an additional token and the reselected token cannot be concatenated to the reselected token marked for highlighting without qualification then the thirteenth step 13 of the method is marking the reselected token as a loose token, concatenating the reselected token to the reselected token marked for highlighting, reselecting token next in sequence and returning to the tenth step 10, and if no token to reselect then printing in the second font the reselected token marked for highlighting except for any reselected token marked as a loose token, printing in the first font any reselected token marked as a loose token, and stopping.

If the reselected token marked for highlighting can include an additional token and the reselected token can be concatenated to the reselected token marked for highlighting without qualification then the fourteenth step 14 of the method is concatenating the reselected token to the reselected token marked for highlighting, removing the loose token mark from any reselected token so marked, reselecting token next in sequence and returning to the tenth step 10, and if no token to reselect then printing in the second font the reselected token marked for highlighting and stopping.

If the reselected token marked for highlighting cannot include an additional token then the fifteenth, and final, step 15 of the method is printing in the second font the reselected token marked for highlighting except any reselected token marked as a loose token, printing in the first font any reselected token marked as a loose token, and returning to the eighth step 8.

What is claimed is:

1. Method of identifying user-definable textual units and highlighting the same using a computer, comprising the steps of:

(a) receiving text in a computer;
(b) identifying each token in the text, where each token is selected from the group of tokens consisting of text, at least one number, at least one space, punctuation, at least one end-of-line indicator, and any combination thereof, where an alpha-numeric portion of a token is a word, and where the leading non-alpha-numeric portion of a token is a pre-word;
(c) selecting a token,
(d) determining in the selected token each user-definable textual-unit prefix, each user-definable textual-unit root, each user-definable textual-unit suffix, each user-definable disqualified textual-unit, and a length of the selected token;
(e) replacing each determined textual-unit prefix, root, and suffix with a standard form of the same;
(f) if there is an unselected token next in sequence then selecting the token next in sequence from the previously selected token and returning to step (d);
(g) reselecting the token selected in step (c) and assigning to the reselected token, a descriptor of "currently reselected token";
(h) if the currently reselected token does not start a user-definable textual unit then printing the currently reselected token in a first font, reselecting a token next in sequence from the currently reselected token, reassigning the currently reselected token descriptor to the token reselected in this step, and returning to step (h), and if there is not a token to reselect then stopping the method of identifying user-definable textual units and highlighting the same using a computer;
(i) if the currently reselected token does start a user-definable textual unit then marking the currently reselected token for highlighting, reselecting a token next in sequence from the currently reselected token, reassigning the currently reselected token descriptor to the token reselected in this step, and if there is not a token to reselect then printing in a second font the currently reselected token marked for highlighting and stopping the method of identifying user-definable textual units and highlighting the same using a computer;
(j) if the currently reselected token reselected in the last executed step in the method, which is either step (i) or step (m), is an end-of-textual-unit indicator then printing in the second font the reselected token marked for highlighting, which just had the descriptor of "currently reselected token" deassigned from it, except any reselected token marked as a loose token, printing any reselected tokens marked as loose tokens in the first font, and returning to step (h);
(k) if the currently reselected token reselected in step (i) is not an end-of-textual-unit indicator then determining if the reselected token marked for highlighting, which just had the descriptor of "currently reselected token" deassigned from it, can include an additional token;
(l) if the reselected token marked for highlighting, which just had the descriptor of "currently reselected token" deassigned from it, can include an additional token then determining if a reselected token not marked for highlighting can be concatenated to the reselected token marked for highlighting, which just had the descriptor of "currently reselected token" deassigned from it;
(m) if the reselected token marked for highlighting, which just had the descriptor of "currently reselected token" deassigned from it, can include an additional token and the reselected token not marked for highlighting determined in step (l) cannot be concatenated to the reselected token marked for highlighting, which just had the descriptor of "currently reselected token" deassigned from it, then marking the reselected token not marked for highlighting as a loose token, concatenating the reselected token not marked for highlighting to the reselected token marked for highlighting, which just had the descriptor of "currently reselected token" deassigned from it, reselecting a token next in sequence from the currently reselected token and returning to step (j), and if there is not a token to reselect then printing in the second font the reselected token marked for highlighting, which just had the descriptor of "currently reselected token" deassigned from it, except for any reselected token marked as a loose token, and printing in the first font any reselected token marked as a loose token and stopping the method of identifying user-definable textual units and highlighting the same using a computer;

(n) if the reselected token marked for highlighting, which just had the descriptor of "currently reselected token" deassigned from it, can include an additional token and the reselected token not marked for highlighting determined in step (l) can be concatenated to the reselected token marked for highlighting, which just had the descriptor of "currently reselected token" deassigned from it, then concatenating the reselected token not marked for highlighting, which just had the descriptor of "currently reselected token" deassigned from it, in the reselected token marked for highlighting, removing the loose token mark from any reselected token so marked, reselecting a token next in sequence from the currently reselected token and returning to step (j), and if there is not a token to reselect then printing in the second font the reselected token marked for highlighting, which just had the descriptor of "currently reselected token" deassigned from it, and stopping the method of identifying user-definable textual units and highlighting the same using a computer; and (o) if the reselected token marked for highlighting, which just had the descriptor of "currently reselected token" deassigned from it, cannot include an additional token then printing in the second font the reselected token marked for highlighting, which just had the descriptor of "currently reselected token" deassigned from it, except any reselected token marked as a loose token, printing in the first font any reselected token marked as a loose token, and returning to step (h).

2. The method of claim 1, wherein the step of receiving text is comprised of the step of receiving text written predominantly in a first language, but containing textual units of a second language.

3. The method of claim 2, wherein the step of determining in the selected token each user-definable textual-unit prefix, each user-definable textual-unit root, each user-definable textual-unit suffix, each user-definable disqualified textual-unit, and what is the token's length is comprised of the step of determining in the selected token each user-definable textual-unit prefix in a second language, each user-definable textual-unit root in a second language, each user-definable textual-unit suffix in a second language, each user definable disqualified textual-unit in the first language, and a length of the selected token, where the user-definable disqualified textual-unit includes a dictionary word in the first language and a user-definable stop-list word in the first language.

4. The method of claim 2, wherein the step of if the currently reselected token does start a user-definable textual unit is comprised of the step of if the currently reselected token does start a user-definable name in the second language then marking the currently reselected token for highlighting, reselecting token next in sequence from the currently reselected token, reassigning the currently reselected token descriptor to the token reselected in this step, and if there is not a token to reselect then printing the currently reselected token marked for highlighting in a second font and stopping the method of identifying user-definable textual units and highlighting the same using a computer.

5. The method of claim 2, wherein the step of if the currently reselected token reselected in step (i) is an end-of-textual-unit indicator is comprised of the step of if the currently reselected token reselected in step (i) is an end-of-textual-unit indicator then printing in the second font selected from the group of fonts consisting of bolding, underlining, coloring, hyperlinking, superscripting, subscripting, and any other suitable font the reselected token marked for highlighting, which just had the descriptor of "currently reselected token" deassigned from it, except any reselected token marked as a loose token, printing in a first font selected from the group of fonts consisting of bolding, underlining, coloring, hyperlinking, superscripting, subscripting, and any other suitable font any reselected token marked as a loose token, and returning to step (h).

6. The method of claim 1, further including the step of converting each token identified to all uppercase characters, if possible.

7. The method of claim 1, wherein the step of selecting a token is comprised of the step of selecting a token that is first in sequence.

8. The method of claim 1, wherein the step of if the currently reselected token reselected in the last executed step in the method, which is either step (i) or step (m), is an end-of-textual-unit indicator is comprised of the step of determining if the reselected token includes an end-of-textual-unit-indicator selected from the group of end-of-textual-unit-indicators consisting of "AKA", "also known as", "formerly", and incorporated.

9. The method of claim 1, wherein the step of if the currently reselected token does not start a user-definable textual unit is comprised of the step of if the currently reselected token does not start a user-definable name then printing the currently reselected token in a first font, reselecting the token next in sequence from the currently reselected token, reassigning the currently reselected token descriptor to the token reselected in this step, and returning to step (h), and if there is not a token to reselect then stopping the method of identifying user-definable textual units and highlighting the same using a computer, where the currently reselected token starts a textual unit if it satisfies the following logical relationship: (the currently reselected token includes a user-definable root OR the currently reselected token includes a user-definable prefix) AND (the currently reselected token does not include a user-definable disqualified textual unit) AND (the currently reselected token does not include less than two characters).

10. The method of claim 1, wherein the step of determining if the currently reselected token reselected in the last executed step in the method, which is either step (i) or step (m), is an end-of-textual-unit indicator is comprised of the step of determining if the following logical relationship is satisfied: (the currently reselected token not marked for highlighting is a number OR (the currently reselected token not marked for highlighting is a user-definable disqualified word OR (the currently reselected token not marked for highlighting includes a user-definable condition, where the user-definable condition includes having more than one line-indicator)).

11. The method of claim 10, wherein a user-definable disqualified word includes a word that satisfies the following logical relationship: (the currently reselected token not marked for highlighting is longer than 6 characters OR the currently reselected token not marked for highlighting is (longer than 10 characters AND ends in "ed")) OR (the currently reselected token not marked for highlighting is an end-of-textual-unit indicator) OR (the currently reselected token not marked for highlighting includes a space OR includes punctuation).

12. The method of claim 1, wherein the step of if the currently reselected token reselected in step (i) is not an end-of-textual-unit indicator is comprised of the step of determining if the following logical relationship is satisfied: (the number of loose tokens in the reselected token marked for highlighting, which just had the descriptor of "currently reselected token" deassigned from it, is less than a user-definable number AND the number of loose tokens in the reselected token marked for highlighting, which just had the descriptor of "currently reselected token" deassigned from it, that are disqualified textual units is below a user-definable number AND (the reselected token marked for highlighting, which just had the descriptor of "currently reselected token" deassigned from it, does not include a new-line indicator OR the reselected token marked for highlighting, which just had the descriptor of "currently reselected token" deassigned from it, is below 80 characters in length)).

13. The method of claim 1, wherein the step of if the reselected token marked for highlighting, which just had the descriptor of "currently reselected token" deassigned from it, can include an additional token then determining if the reselected token not marked for highlighting determined in step (l) can be concatenated to the reselected token marked for highlighting, which just had the descriptor of "currently reselected token" deassigned from it, is comprised of the step of if the reselected token marked for highlighting, which just had the descriptor of "currently reselected token" deassigned from it, can include an additional token then determining if the following logical relationship is satisfied: ((a word portion of the reselected token not marked for highlighting, which just had the descriptor of "currently reselected token" deassigned from it, includes only alphabetic characters AND follows a prefix other than the character "a") OR ((the word portion of the reselected token not marked for highlighting, which just had the descriptor of "currently reselected token" deassigned from it, is not a user-definable disqualified word) AND ((the reselected token not marked for highlighting, which just had the descriptor of "currently reselected token" deassigned from it, includes a user-definable root) OR (the reselected token not marked for highlighting, which just had the descriptor of "currently reselected token" deassigned from it, includes a user-definable prefix AND (directly follows a reselected token nor marked as a loose token OR is NOT the character "a" OR does not directly follow a disqualified word)) OR (the word portion of the reselected token not marked for highlighting, which just had the descriptor of "currently reselected token" deassigned from it, is a user-definable suffix AND directly follows a reselected token that is not marked as a loose token))) OR (the reselected token not marked for highlighting, which just had the descriptor of "currently reselected token" deassigned from it, includes two open parentheses)).

14. The method of claim 1, wherein the step of if the reselected token marked for highlighting, which just had the descriptor of "currently reselected token" deassigned from it, cannot include an additional token is comprised of the step of if the reselected token marked for highlighting, which just had the descriptor of "currently reselected token" deassigned from it, cannot include an additional token then printing in the second font selected from the group of fonts consisting of bolding, underlining, coloring, hyperlinking, superscripting, subscripting, and any other suitable font the reselected token marked for highlighting, which just had the descriptor of "currently reselected token" deassigned from it, except any reselected token marked as a loose token, printing in the first font selected from the group of fonts consisting of bolding, underlining, coloring, hyperlinking, superscripting, subscripting, and any other suitable font any reselected token marked as a loose token, reselecting a token next in sequence from the currently reselected token and returning to step (h) and if there is not a token to reselect then stopping the method of identifying user-definable textual units and highlighting the same using a computer.

\* \* \* \* \*